(12) United States Patent
Smith

(10) Patent No.: US 11,203,533 B2
(45) Date of Patent: Dec. 21, 2021

(54) REMOVAL AND DETECTION OF ALGAE, THEIR TOXINS, AND EXCESS NUTRIENTS

(71) Applicant: Scott C. Smith, Osterville, MA (US)

(72) Inventor: Scott C. Smith, Osterville, MA (US)

( * ) Notice: Subject to any disclaimer, the term of this patent is extended or adjusted under 35 U.S.C. 154(b) by 0 days.

(21) Appl. No.: 16/580,611

(22) Filed: Sep. 24, 2019

(65) Prior Publication Data

US 2020/0156960 A1 May 21, 2020

Related U.S. Application Data

(60) Provisional application No. 62/735,302, filed on Sep. 24, 2018.

(51) Int. Cl.
| | | |
|---|---|---|
| *C02F 1/28* | (2006.01) | |
| *C02F 101/10* | (2006.01) | |
| *C02F 101/34* | (2006.01) | |
| *C02F 101/38* | (2006.01) | |
| *C02F 103/00* | (2006.01) | |

(52) U.S. Cl.
CPC .............. *C02F 1/285* (2013.01); *C02F 1/283* (2013.01); *C02F 1/288* (2013.01); *C02F 2101/105* (2013.01); *C02F 2101/34* (2013.01); *C02F 2101/38* (2013.01); *C02F 2103/007* (2013.01)

(58) Field of Classification Search
None
See application file for complete search history.

(56) References Cited

U.S. PATENT DOCUMENTS

| | | |
|---|---|---|
| 8,853,289 B2 | 10/2014 | Smith et al. |
| 9,878,924 B2 | 1/2018 | Beierwaltes et al. |
| 2013/0087503 A1* | 4/2013 | Youngs .................. E02B 15/10 210/660 |
| 2013/0213872 A1* | 8/2013 | Phelan .................... C02F 1/003 210/198.1 |
| 2013/0240451 A1 | 9/2013 | Curtis, Jr. et al. |
| 2016/0229709 A1 | 8/2016 | Beierwaltes et al. |
| 2017/0146435 A1 | 5/2017 | Smith |
| 2017/0241870 A1 | 8/2017 | Smith |
| 2019/0017983 A1 | 1/2019 | Smith |

FOREIGN PATENT DOCUMENTS

CN 101125268 A 8/2016

OTHER PUBLICATIONS

Machine Language Translation of CN101125268A (Luan et al) obtained from Patentscope on Jan. 25, 2021. (Year: 2008).*
The International Search Report and the Written Opinion of the International Searching Authority dated Jan. 16, 2020 for PCT/US2019/52665.
English Translation of Chinese Patent CN101125268A filed on Feb. 20, 2020.

* cited by examiner

*Primary Examiner* — Matthew O Savage
(74) *Attorney, Agent, or Firm* — Brian M. Dingman; Dingman IP Law, PC

(57) ABSTRACT

A method of removing from water at least one of algae, bacteria, toxins produced by algae, toxins produced by bacteria, and algae nutrients by placing an open-cell foam material into the water, leaving the material in the water for sufficient time to adsorb/absorb at least one of algae, their toxins, and their nutrients, and then removing the open-cell foam material from the water.

12 Claims, 1 Drawing Sheet

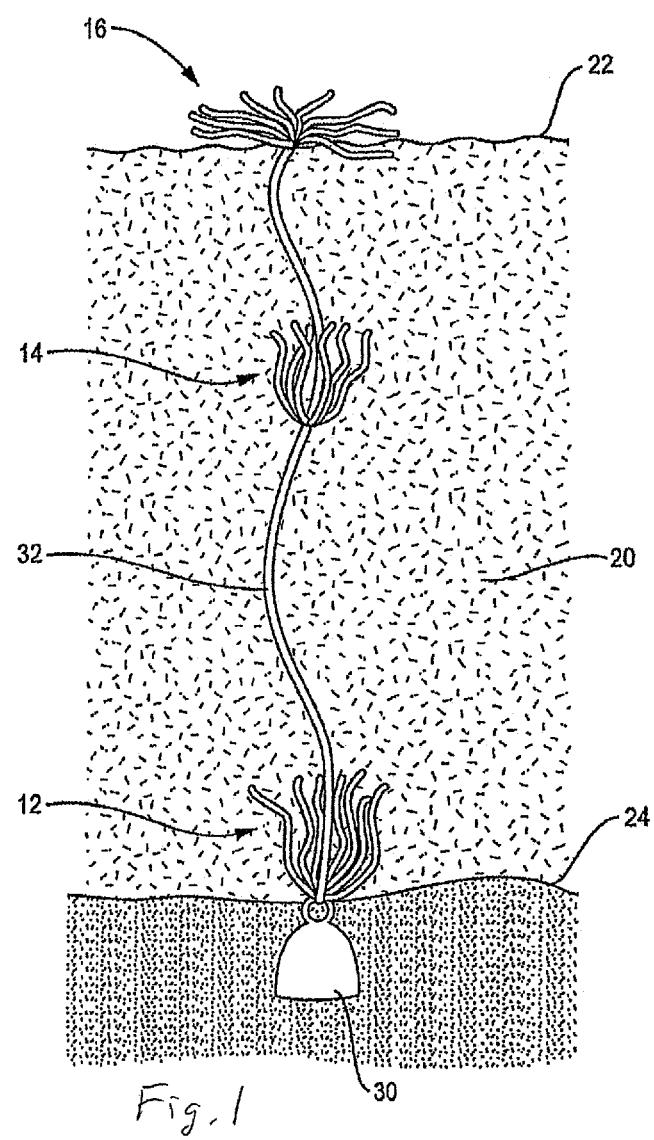
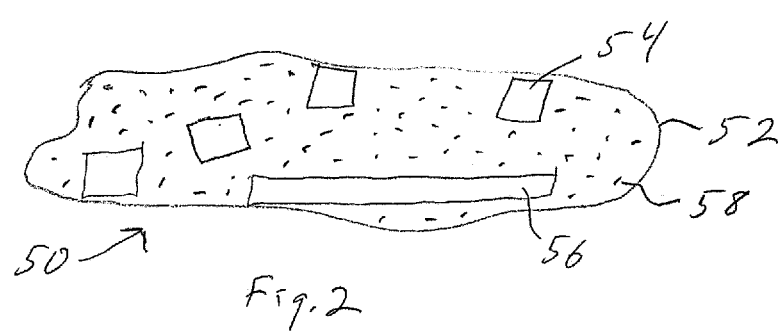

REMOVAL AND DETECTION OF ALGAE, THEIR TOXINS, AND EXCESS NUTRIENTS

CROSS-REFERENCE TO RELATED APPLICATION

This application claims the priority of Provisional Application 62/735,302 filed on Sep. 24, 2018, the entire disclosure of which is incorporated herein by reference.

BACKGROUND

This disclosure relates to the removal of harmful materials from bodies of water using an open-cell foam material.

Harmful algal blooms ("HABs") occur when colonies of algae, which includes cyanobacteria (sometimes referred to as "blue-green algae") grow out of control. HABs produce toxins (commonly referred to as cyanotoxins) which cause harmful effects on people, mammals (e.g., dogs), fish, shellfish, marine mammals, birds, and other life. Cyanotoxins usually target the nervous system, the liver, or the skin.

HABs are occurring more often and in locations not previously affected as a result of climate change and increasing challenges with uncontrolled discharges of excess nutrients (mainly phosphorus and nitrogen) into bodies of water.

Among cyanotoxins are some of the most powerful natural poisons known, including poisons which can cause rapid death by respiratory failure. The toxins include potent neurotoxins, hepatotoxins, cytotoxins, and endotoxins. Recreational exposure to cyanobacteria can result in gastrointestinal and hay fever symptoms or skin rashes.

Exposure to the cyanobacteria hepatotoxin Microcystin (MC) can cause serious damage to the liver. Acute health effects include abdominal pain, vomiting and nausea, diarrhea, headache, blistering around the mouth, and after inhalation sore throat, dry cough, and pneumonia.

Exposure to the cyanobacteria neurotoxin BMAA may be an environmental cause of neurodegenerative diseases such as amyotrophic lateral sclerosis (ALS), Parkinson's disease, and Alzheimer's disease.

Much of the coastline and bodies of fresh water (even in the mainland) throughout the world experience HABs. These blooms are a global problem because they affect not only the health of people and marine ecosystems, but also the economy.

Practical, cost effective, scalable, and efficient solutions to remove excess nutrients in water that facilitate HABs have been relatively non-existent. Additionally, solutions to cost effectively and efficiently mitigate HABs and related cyanotoxins without moving the dangerous cyanotoxins from one body of water to another (e.g., from a pond to an underground injection well) and/or from a body of water to a landfill have also been relatively non-existent.

Furthermore, chemicals or other substances that mitigate and/or kill the HABs are known to also kill aquatic life and/or pose risks to human health among other mammals such as dogs and in some cases, protected wildlife.

SUMMARY

The methods of removing algae, bacteria, their toxins, and/or excess nutrients contemplate placing an open-cell foam material in the water such that the open-cell foam material takes up the algae, bacteria, their toxins, and/or their nutrients. When the material is removed from the water, the algae, the bacteria, their toxins, and/or excess nutrients are removed. The use of the material is thus effective to reduce contamination levels in the water. Also, biochar can be incorporated into the foam and/or used by itself, separately, with the foam configurations.

Attributes of the methods include:
- Passive or non-invasive, meaning no leaching of chemicals.
- Renewable/sustainable in that once the open-cell foam is saturated it can be transported to a waste-to-energy facility where the foam is burned, thereby destroying the toxins without impacting another body of water or moving the toxins to a landfill.
- Renewable/sustainable in that when biochar is included (either embedded in the foam or in a self-contained (e.g. an 8" diameter sock with a 12" length) device attached to and/or alongside the open-cell foam, the biochar with adsorbed/absorbed nutrients can be used to help restore impaired soils.

In one aspect, a method of removing from water at least one of algae, bacteria, toxins produced by algae, toxins produced by bacteria, and algae nutrients, includes placing an open cell foam material into the water, leaving the material in the water for sufficient time to adsorb/absorb at least one of algae, bacteria, their toxins, and excess nutrients, and then removing the open-cell foam material from the water.

The toxins may be produced by cyanobacteria. At least about 1,000 ppb of the toxins may be removed. At least about 250,000 ppb of the toxins may be removed. Algae may be removed. Microcystins (MC) may be removed. Cyanobacteria may be removed. The foam may comprise EMA or a blend of Engage/metallocene or single site initiated polyethylene and LDPE. Phosphorus may be removed. The method may further comprise placing a biochar into the water with the foam. The biochar may be incorporated into the foam and/or it may be deployed in conjunction with the foam.

BRIEF DESCRIPTION OF THE DRAWINGS

FIG. 1 depicts one non-limiting example of the placement of open-cell foam material into a body of water.

FIG. 2 schematically illustrates a combined foam/biochar contaminant removal device.

DETAILED DESCRIPTION

Featured in this disclosure is the use of open-cell foam materials to remove from water excess nutrients for HABs and/or HABs, and/or the associated cyanotoxins produced and/or released by the HABs. The open-cell foam materials can comprise or be made from polyolefins (e.g., polyethylene, low-density polyethylene, and/or Engage polyolefin from the Dow Chemical Company), polyurethanes, ethylene-alkyl acrylate copolymers such as EMA, EMA-polyolefin blends, and other foamed polymers with open (as opposed to closed) cells. Materials that can be used include but are not limited to the open-cell foam materials disclosed in the following U.S. patents/published patent applications, the entire disclosures of which are incorporated herein by reference for all purposes: U.S. Pat. No. 8,853,289; 2013/0240451; 2017/0146435; 2017/0241870; and 2019/0017983.

The open-cell foam materials are able to remove from water HABs, cyanotoxins, and excess nutrients such as phosphorus that effectively "feed" the HABs. The open-cell foams' chemistry, open-cell surface area and capillary network are effective to absorb these HABs, excess nutrients, and toxins into the open-cell capillary network by adsorbing them to cell walls and thus removing them from the waterway.

Furthermore, the foam can remove and detect food sources for what is known as blue-green algae/cyanobacteria, including phosphorous. By deploying various designs of fabricated open-cell foam it is contemplated that phosphorous can be effectively removed to assist in the prevention of blue-green algae/cyanobacteria blooms. One such embodiment is a flow-through container (like a sock or a mesh container) that contains both the foam and the biochar, and that is left in or moved through the water. This filtration device can be used to remove all other substances that are referenced in this disclosure, in various bodies of water.

In one aspect, this disclosure features a method of detecting the presence of and/or of removing from water HABs, bacteria, their toxins, and their excess nutrients. In the methods, an open-cell foam material is placed into the water (e.g., placed on the surface, placed under the surface, or moved up and down in the water column and/or side to side on the surface or in the water column). The foam material (with or without biochar that can be incorporated into the foam or deployed together with the foam) is left in the water for a time, and then removed. The removed foam material can then be (but need not be) tested for removed material(s), in some cases using an EPA-approved test procedure. The testing may be for HABs, toxins produced by HABs, and/or nutrients that are used by HABs. Testing is not necessary for the removal of harmful materials, but is helpful to establish what was removed and the efficacy of the method. The contaminated foam can be burned (e.g., in a waste to energy plant), in order to destroy the HABs, toxins, and excess nutrients. The contaminated foam can be disposed of in other ways as well.

FIG. 1 depicts three groups of strips or "blades" of open-cell foam material 12, 14 and 16. Each group has multiple strips that are held together at about their centers. The groups are fastened to a line 32 that is held on the bottom 24 of water body 20 by weight or anchor 30. In this example group 16 floats on the water surface 22, while groups 12 and 14 are held at different depths below the surface. This disclosure allows for the placement of open-cell foam material at any one or more heights of a body of water, and at one or more locations in the body of water. Various non-limiting methods of exposing the open-cell material to water are described herein; any such method can be used as desired or as necessary depending on the body of water, and/or the contaminant removal or testing regime that is desired under the circumstances.

After desired exposure times, one or more portions of the foam material (or all of the foam material) are removed from the water. This can be done by clipping or cutting a piece of foam, or removing an entire group or other portion or separate piece of foam, for example. The exposure times can be from seconds to minutes to hours to days to weeks to months, depending on the particular testing/removal regime. Since the open-cell foam absorbs and adsorbs algae, bacteria, their toxins, and their nutrients, if desired the removed portions of the foam can be tested for particular removed contaminants/materials. The foam can act as an accumulator for these contaminants. Also, the different locations and different exposure times allow for a tailored review of contaminants, their locations, and their movement within the water.

FIG. 2 depicts a contaminant-removal structure 50 comprising a sock or other container (either hard or soft/flexible) 58, through which water can permeate and flow. The size of the openings in container 58 are selected such that any material inside will not pass through the wall. Inside can be one or both of foam material and biochar. In the illustrated example there are pieces and/or strips of foam material (54 and 56, respectively) interspersed with biochar particles 58 (indicated by small dots). The foam may or may not contain biochar, and/or the biochar can be included separately from the foam. Structure 50 can be used in addition to or in place of the foam structures shown in FIG. 1.

Following are some test result data for tests using the foam materials to remove HABs, their toxins, and their nutrients from bodies of water.

Test I: MC Removal

Nine open-cell foams were floated on a river in Florida that was experiencing a cyanobacteria bloom. The foams were left in the river for 4-6 hours. The foams were made from EMA or from an Engage/low-density polyethylene (LDPE) formulation. In the foam testing (reported below), all tested foam configurations had absorption of HAB toxins (in this case microcystins or MC) in the range from 45,000 ppb-259,000 ppb (ppb reported as ppb toxins per dry weight of foam). The open-cell foam configurations were deployed directly in HABs in the river for approximately 4-6 hours. The analysis of the samples was performed by a third-party EPA and state-approved independent laboratory using U.S. EPA Method 546 and Ohio EPA DES 701.0. Testing can be accomplished following guidelines of the Florida DEP and U.S. EPA, or other established testing guidelines.

The data and analysis results of Test I are partially summarized as follows:

Of the nine samples, consisting of various open-cell foam compounds/product configurations, seven had over 100,000 ppb of MC absorbed into the open-cell foam matrix.

The four samples that showed the highest MC toxin removal values were:
  a. Large-Cell (1.5 mm-3.5 mm cell size) EMA Pad. Size 72" long×12" wide×0.25" thick. 259,000 ppb of MC toxins adsorbed.
  b. Medium-Cell (1.0 mm-2.5 mm cell size) Engage/LDPE WaterBug. 247,000 ppb of MC toxins adsorbed. A waterbug is an assembly of foam strips having dimensions of approximately 0.25×0.25×4" that are fixed together at their centers to create an assembly that looks like a pom-pom, as depicted in FIG. 1.
  c. Large-Cell (1.5 mm-3.5 mm cell size) EMA Roll. 236,000 ppb of MC toxins adsorbed.
  d. Large-Cell (1.5 mm-3.5 mm cell size) EMA Eelgrass. 196,000 ppb of MC toxins adsorbed.

For additional context to understand the significance of these results, in 2015 and 2016, the EPA released Health Advisories related to HABs and cyanotoxins/microcystins. The HAB metrics help establish relevant benchmarks and context. For drinking water, in 2015 when instantaneous grab samples are used, the EPA Health Advisory set the concentration limit at 1.6 ppb for health guidelines for adults and children. In 2016, for recreation and non-potable water, the EPA Health Advisory set the grab-sample concentration limit at 4 ppb. Note that one should not compare any health recommendations as to the concentration levels in water itself directly to the uptake of the toxins into the open-cell foam capillary network or matrix. However, these data illustrate the importance of removing the toxins from the water (because 4 ppb is the threshold for certain health advisories for non-potable water/recreation) and the importance of removing the toxins from water by concentrating the toxins into the open-cell foam capillary network.

Test II: MC Removal

Drinking water health advisories as set by the EPA are currently 0.1 ppb of total MC for children and 1.2 ppb of MC for adults.

In another example, whole lake water was taken from an HAB contaminated pond in Barnstable, Mass., USA. The water was used as a control to establish a baseline of known microcystins in the water. The microcystins in the control were 0.077 ug/l (ppb) as analyzed and tested under EPA method 546. Strips of two different foam formulations (100% EMA, and a 50/50 blend of Engage polyethylene and LDPE) were placed into 225 ml of the control water and left floating on the surface for 10 hours. After 10 hours, the foam matrix was removed from the control water and then the remaining water was tested to determine how much of the microcystins were removed from the control water. Also, the foam was squeezed manually to remove water from the foam, and the removed water was tested for MC level.

The MC level in the control water was 0.077 ppb. The MC left after exposure to the EMA foam was 0.047 ppb (a MC reduction of 39%), and the MC left after exposure to the 50/50 blend foam was 0.031 ppb (a MC reduction of 60%). The water removed from the EMA foam had 0.356 ppb MC, and the water removed from the 50/50 blend foam had 0.380 ppb MC.

In a second set of tests, the control water was concentrated such that its MC level was 3.516 ppb. The concentrated control water was then subjected to the same tests as above. The MC left after exposure to the EMA foam was 2.891 ppb (a MC reduction of 18%), and the MC left after exposure to the 50/50 blend foam was 2.275 ppb (a MC reduction of 35%). The water removed from the EMA foam had 12.972 ppb MC, and the water removed from the 50/50 blend foam had 15.619 ppb MC.

Test III: Algae/MC Removal

Identifying and measuring algae (which includes bacteria such as cyanobacteria) or algal biomass in water can be done with a variety of methods including but not limited to the methods outlined herein. Any accepted method including EPA methods and other established laboratory methods can be used to measure and identify the algae and/or algal biomass contained therein. Algal biomass is the amount of algae in a water body at a given time. For example, cyanobacteria contain a pigment named phycocyanin which is any group of blue, photosynthetic pigments present in cyanobacteria. One method to measure algae is using a fluorimeter to identify and measure these blue pigments in the biomass or algae absorbed into the open-cell foam.

Methods that can be used to identify and measure algae and/or algal biomass herein include but are not limited to: Counting methods that include the use of a microscope or coulter counter. In vivo methods that include Nephelometry, Spectrophotometric attenuance, and fluorescence in vivo. Chemical methods that include reducing capacity (carbon equivalent), Spectrophotometry (Ch1 a extract), and Fluorometry (Ch1 a extract).

In this testing, an open-cell foam in the form of a WaterBug® was placed into Santuit Pond in Mashpee, Mass., USA and moved throughout the water column (including movement over the surface of the water). The pond had known problems with HABs (harmful algal blooms). The open-cell foam was removed after 20 minutes of exposure to the entire water column and sent to an independent laboratory for testing using AMNIS flow cytometry for measuring the cell counts and/or algal biomass. Enzyme linked immunosorbent assay ("ELISA") was used to detect and measure Microcystins and Noduralins toxins.

The open-cell foam tested for live cells per ml were 149 billion cells per ml. The open-cell foam tested for dead cells per ml were 299 billion cells per ml.

The pond water contained 0.296 ppb of MC. The water was squeezed out of the foam and analyzed, and contained at least 26.3 ppb of MC (some may have stayed in the open-cell foam) or 88.85 times the concentration in the base pond water. This lab testing along with the previous testing in the preceding paragraphs clearly illustrates the ability of the subject invention to remove, detect, and concentrate into the open-cell foam matrix algae, algal biomass, and toxins produced by HABs.

In another aspect of this disclosure, biochar is used together with the open-cell foam. The biochar can be incorporated into the open-cell foam itself (e.g., by mixing biochar into the polymer material before it is foamed), and/or the biochar can be deployed in a separate configuration (e.g. 8" diameter sock with a 12" length) attached/connected to the open-cell foam in the water. The open-cell foam also helps to prevent the biochar from sinking in the water column. A biochar is disclosed in U.S. Pat. No. 9,878,924, the disclosure of which is incorporated herein by reference.

Biochar is a charcoal that can be used as a soil amendment. Biochar is a stable solid, rich in carbon, and can endure in soil for thousands of years. Like most charcoal, biochar is made from biomass via pyrolysis. Biochar is under study as an approach to carbon sequestration as it has the potential to help mitigate climate change. It results from processes related to pyrogenic carbon capture and storage (PyCCS). Independently, biochar can increase soil fertility of acidic soils (low pH soils), increase agricultural productivity, and provide protection against some foliar and soil-borne diseases. Biochar is defined by the International Biochar Initiative as "The solid material obtained from the thermochemical conversion of biomass in an oxygen-limited environment."

A number of implementations have been described. Nevertheless, it will be understood that additional modifications may be made without departing from the scope of the inventive concepts described herein, and, accordingly, other examples are within the scope of the following claims.

What is claimed is:

1. A method of removing at least one of algae, cyanobacteria, and cyanotoxin from water, comprising:
    placing an open-cell foam material into the water, wherein the open-cell foam material comprises a foamed polymer with open cells with an open cell size of at least 1 mm;
    leaving the open-cell foam material in the water for sufficient time to adsorb/absorb the at least one of algae, cyanobacteria, and cyanotoxin; and then
    removing the open-cell foam material from the water.

2. The method of claim 1, wherein at least about 1,000 ppb of the cyanotoxin are removed.

3. The method of claim 1, wherein at least about 250,000 ppb of the cyanotoxin are removed.

4. The method of claim 1, wherein the algae is removed.

5. The method of claim 1, wherein the cyanobacteria are removed.

6. The method of claim 1, wherein the foam comprises ethylene methyl acrylate copolymer (EMA) or a blend of polyolefin elastomer and low density polyethylene (LDPE).

7. The method of claim 1, wherein phosphorus is removed.

8. The method of claim 1, further comprising placing a biochar into the water with the foam.

9. The method of claim 8, wherein the biochar is incorporated into the foam.

10. The method of claim 8, wherein the biochar is deployed in conjunction with the foam.

11. A method of removing at least one of algae and cyanobacteria from water, comprising:
    placing an open-cell foam material into the water, wherein the open-cell foam material comprises a foamed polymer with open cells with an open cell size of at least 1 mm;
    leaving the open-cell foam material in the water for sufficient time to adsorb/absorb the at least one of algae and cyanobacteria; and then
    removing the open-cell foam material from the water.

12. The method of claim 11, wherein the foam comprises ethylene methyl acrylate copolymer (EMA) or a blend of polyolefin elastomer and low density polyethylene (LDPE).

* * * * *